United States Patent
White et al.

(10) Patent No.: US 7,725,845 B1
(45) Date of Patent: May 25, 2010

(54) SYSTEM AND METHOD FOR LAYOUT OPTIMIZATION USING MODEL-BASED VERIFICATION

(75) Inventors: David White, San Jose, CA (US); Roland Ruehl, San Carlos, CA (US); Eric Nequist, Monte Sereno, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 302 days.

(21) Appl. No.: 11/678,594

(22) Filed: Feb. 24, 2007

(51) Int. Cl.
*G06F 17/50* (2006.01)
(52) U.S. Cl. ......................................................... 716/2
(58) Field of Classification Search ...................... 716/2
See application file for complete search history.

(56) References Cited

U.S. PATENT DOCUMENTS

| | | | |
|---|---|---|---|
| 5,335,191 A | | 8/1994 | Kundert et al. |
| 5,559,718 A | | 9/1996 | Baisuck et al. |
| 5,654,898 A | * | 8/1997 | Roetcisoender et al. ........ 716/9 |
| 5,729,466 A | | 3/1998 | Bamji |
| 5,862,055 A | | 1/1999 | Chen et al. |
| 5,966,459 A | | 10/1999 | Chen et al. |
| 6,035,244 A | | 3/2000 | Chen et al. |
| 6,066,179 A | | 5/2000 | Allan |
| 6,088,523 A | | 7/2000 | Nabors et al. |
| 6,151,698 A | | 11/2000 | Telichevesky et al. |
| 6,393,602 B1 | | 5/2002 | Atchison et al. |
| 6,470,489 B1 | | 10/2002 | Chang et al. |
| 6,493,849 B1 | | 12/2002 | Telichevesky et al. |
| 6,636,839 B1 | | 10/2003 | Telichevesky et al. |
| 6,751,785 B1 | | 6/2004 | Oh |
| 6,904,581 B1 | | 6/2005 | Oh |
| 6,921,672 B2 | | 7/2005 | Satya et al. |
| 6,996,797 B1 | | 2/2006 | Liebmann et al. |
| 7,194,704 B2 | | 3/2007 | Kotani et al. |
| 7,308,669 B2 | | 12/2007 | Buehler et al. |
| 7,325,206 B2 | | 1/2008 | White et al. |
| 7,353,475 B2 | | 4/2008 | White et al. |
| 7,356,783 B2 | | 4/2008 | Smith et al. |
| 7,360,179 B2 | | 4/2008 | Smith et al. |
| 7,363,099 B2 | | 4/2008 | Smith et al. |
| 7,363,598 B2 | | 4/2008 | Smith et al. |
| 7,367,008 B2 | | 4/2008 | White et al. |
| 7,380,220 B2 | | 5/2008 | Smith et al. |
| 7,383,521 B2 | * | 6/2008 | Smith et al. ................... 716/6 |

(Continued)

OTHER PUBLICATIONS

Office Action dated Sep. 25, 2008 for U.S. Appl. No. 11/678,592.

(Continued)

*Primary Examiner*—Jack Chiang
*Assistant Examiner*—Brandon W Bowers
(74) *Attorney, Agent, or Firm*—Vista IP Law Group LLP

(57) ABSTRACT

Method and system for chip optimization using model based verification (MBV) tool provide more accurate verification in determining hotspots and their characteristics. The MBV and the layout optimizer are implemented within a feedback loop. This type of verification allows for the MBV tool to provide hints, constraints and hotspot information to the layout optimizer. In addition, the model-based simulation results can be used to automatically fix the circuit designs and allow for specialized optimization flow for standard cell libraries.

20 Claims, 7 Drawing Sheets

U.S. PATENT DOCUMENTS

| | | | |
|---|---|---|---|
| 7,386,815 | B2 | 6/2008 | Bickford et al. |
| 7,393,755 | B2 | 7/2008 | Smith et al. |
| 7,418,694 | B2 | 8/2008 | Kobayashi et al. |
| 7,453,261 | B1 | 11/2008 | Mark |
| 7,503,020 | B2 | 3/2009 | Allen et al. |
| 7,592,827 | B1 | 9/2009 | Brozek |
| 2005/0037522 | A1 | 2/2005 | Smith et al. |
| 2005/0051809 | A1 | 3/2005 | Smith et al. |
| 2005/0196964 | A1 | 9/2005 | Smith et al. |
| 2005/0235246 | A1 | 10/2005 | Smith et al. |
| 2005/0251771 | A1 | 11/2005 | Robles |
| 2005/0268256 | A1 * | 12/2005 | Tsai et al. .................. 716/4 |
| 2005/0273739 | A1 | 12/2005 | Tohyama |
| 2006/0123380 | A1 | 6/2006 | Ikeuchi |
| 2006/0265684 | A1 | 11/2006 | Buehler et al. |
| 2006/0273266 | A1 | 12/2006 | Preil et al. |
| 2007/0101305 | A1 | 5/2007 | Smith et al. |
| 2007/0133860 | A1 | 6/2007 | Lin et al. |
| 2007/0256039 | A1 | 11/2007 | White |
| 2007/0294648 | A1 | 12/2007 | Allen et al. |
| 2008/0005704 | A1 | 1/2008 | Miloslavsky et al. |
| 2008/0027698 | A1 | 1/2008 | White |
| 2008/0148201 | A1 | 6/2008 | Lanzerotti et al. |
| 2008/0160646 | A1 | 7/2008 | White et al. |
| 2008/0162103 | A1 | 7/2008 | White et al. |
| 2008/0163139 | A1 | 7/2008 | Scheffer et al. |
| 2008/0163141 | A1 | 7/2008 | Scheffer et al. |
| 2008/0163148 | A1 | 7/2008 | Scheffer et al. |
| 2008/0163150 | A1 | 7/2008 | White et al. |
| 2008/0189664 | A1 | 8/2008 | Bickford et al. |
| 2008/0195359 | A1 | 8/2008 | Barker et al. |
| 2008/0216027 | A1 | 9/2008 | White et al. |
| 2009/0031261 | A1 | 1/2009 | Smith et al. |
| 2009/0031271 | A1 | 1/2009 | White et al. |
| 2009/0100386 | A1 | 4/2009 | Allen et al. |

OTHER PUBLICATIONS

Barnett et al. "Yield-Reliability Modeling: Experimental Verification and Application to Burn-in Reduction", Proceedings of 20th IEEE VLSI Test Symposium, 2002, pp. 75-80.

Duvivier et al., "Approximation of Critical Area of ICs with Simple Parameter Extracted from the Layout", 1995 IEEE International Conference Workshop on Defect and Fault Tolerance in VLSI Systems, Nov. 13-15, 1995, pp. 1-9.

Harris et al., "Estimates of Integrated Circuit Yield Components from In-Line Inspection Data and Post-Process Sort Data", IEEE/SEMI Advanced Semiconductor Manufacturing Conference, 1997, pp. 150-155.

Segal et al., "Critical Area Based Yield Prediciton Using In-Line Defect Classification Information [DRAMs]", 2000 IEEE/SEMI Advanced Semiconductor Manufacturing Conference and Workshop, Sep. 12-14, 2000, pp. 83-88.

Wagner et al. "An Interactive Yield Estimator as a VLSI CAD Tool", The IEEE International Workshop on Defect and Fault Tolerance in VLSI Systems, Oct. 27-29, 1993, pp. 167-174.

Wang et al., "Yield Modeling of Arbitrary Defect Outline", 8th International Conference on Solid-State and Integrated Circuit Technology, Oct. 23-26, 2006, pp. 1183-1185.

Non-Final Office Action dated May 12, 2009 for U.S. Appl. No. 11/678,593.

Final Office Action dated Apr. 3, 2009 for U.S. Appl. No. 11/678,592.

Notice of Allowance dated Nov. 16, 2009 for U.S. Appl. No. 11/678,593.

Notice of Allowance dated Dec. 14, 2009 for U.S. Appl. No. 11/678,592.

* cited by examiner

SYSTEM AND METHOD FOR LAYOUT OPTIMIZATION USING MODEL-BASED VERIFICATION

RELATED APPLICATION DATA

The present application is related to co-pending U.S. patent application Ser. No. 11/678,592, entitled "System and Method for Performing Verification Based Upon Both Rules and Models," filed on Feb. 24, 2007, and co-pending U.S. patent application Ser. No. 11/678,593 entitled "System and Method for Model-Based Scoring and Yield Prediction," filed on Feb. 24, 2007, which are hereby incorporated by reference in their entirety.

FIELD OF THE INVENTION

The invention relates to Integrated Circuit (chip) design, and in particular, to a system and method for layout optimization using model-based verification (MBV).

BACKGROUND

Layout optimization is performed by analyzing the design at the optimizer. The analyzer may determine rules violations and change the design to try to improve the yield. For example, additional vias may be added to minimize the effects of random via failures. To avoid the belt buckle issue, the spacing is increased. Dummy fill is added to reduce chemical mechanical planarization (CMP) induced dishing and make the surface more planar. However, the changes are determined by the optimizer using design rules and past experience. Therefore, the yield is improved only based on the design rules at the optimizer.

SUMMARY

Methods and systems for allowing an Integrated Circuit (IC) designer to implement layout optimization based on model-based verification.

In one implementation, a method for optimization including providing hints, constraints and hotspot information to the layout optimizer or fix designs automatically based on pure model enabled geometry, computational electrical characteristics or post-RC analysis.

In another implementation, a method for optimizing includes providing a direct connection between the layout optimizer and the model based verification (MBV) tool. The models and hotspots from the MBV are used to generate a database to ensure low yield configurations are not used in the design.

In another implementation, a method for optimization is based on utilizing many types of cost functions that can be used to optimize based on rules, models or a combination thereof.

In another implementation, a method for optimizing specific optimization flow for standard cell libraries.

DETAILED DESCRIPTION

The invention is directed to a method and system for chip optimization using model-based verification alone or in conjunction with design rules. Models are employed to perform simulations to provide more accurate verification in determining the location and characteristics of hotspots. In many cases, the patterns or groups of features that increase the likelihood of undesirable manufacturing effects can be difficult or complex to describe in a series of rules. In such cases, mathematical models of manufacturing effects may be a more efficient way to characterize the manufacturability of the patterns or group of features. The MBV and layout optimizer are connected to form a feedback loop. This type of verification allows for the MBV tool to provide hints, constraints and hotspot information to the layout optimizer, which attempts to modify the design to eliminate hotspots, reduce likelihood of problems and improve functional and parametric yield. In addition, the model-based simulation results may be used to automatically improve circuit designs and allow for specialized optimization flow for standard cell libraries.

Figure 1:
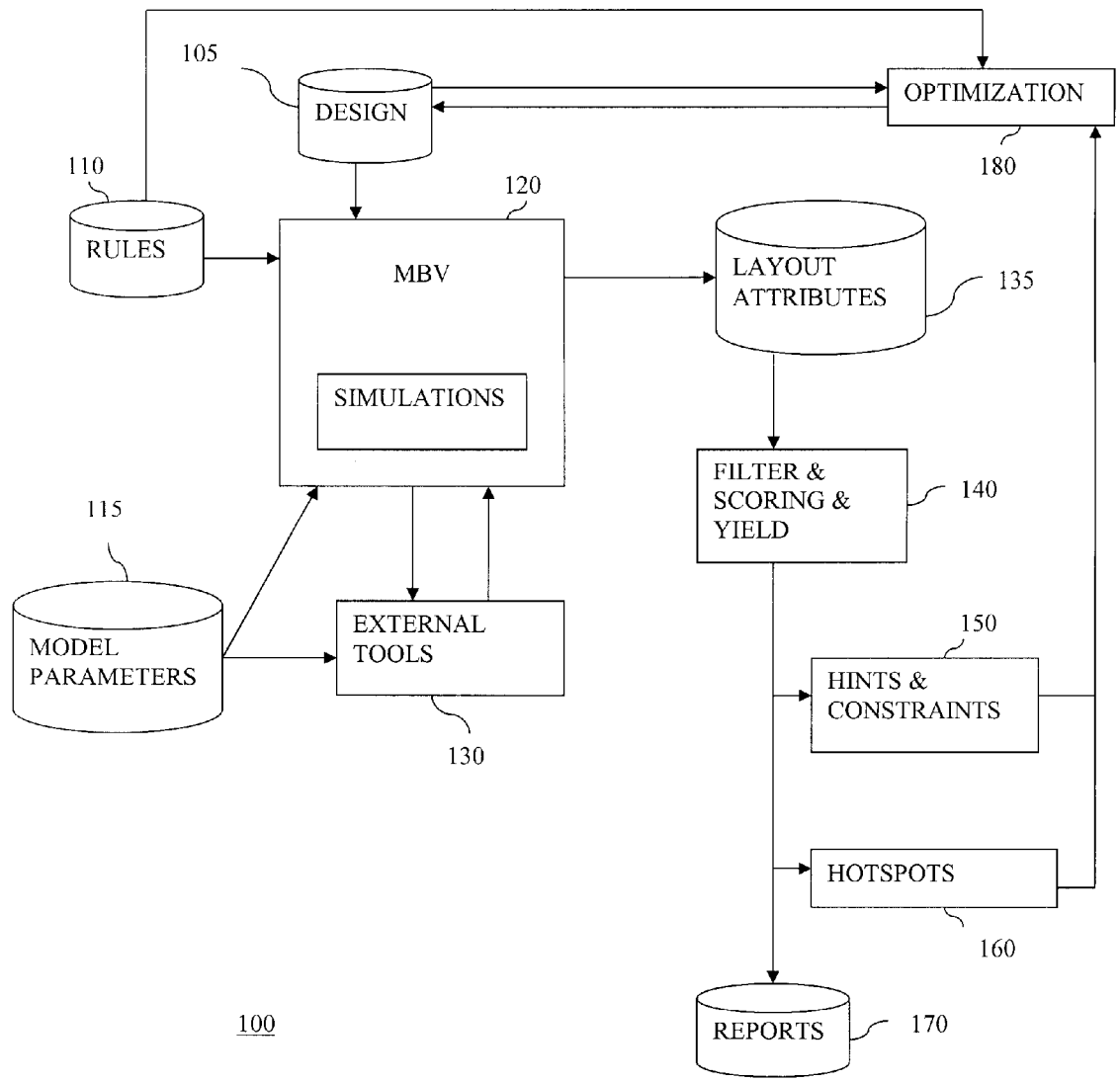
FIG. 1 depicts an architectural overview of an infrastructure for performing verification based upon both rules and models.

FIG. 1 depicts an architectural overview of an infrastructure for performing verification based upon both rules and models. The circuit design is simulated to represent the final result of the fabricated structures. The verification is performed by applying rules on the structures to better predict the hotspots.

The architectural overview 100 includes a model-based verification (MBV) tool 120 which performs simulations using the design 105, which includes layout of the circuits. The MBV will also accept design rules as input. In one embodiment, standard design rule check (DRC) rules are used. In another embodiment, model based rules are used. Any design rules may be used as desired by the designer. The MBV also accepts the model parameters for performing the simulations 125. In one embodiment, the simulations are performed in software. In another embodiment, the simulation is performed in hardware. Any simulator may be used for simulation of the design. The simulated design represents the final product of the design on wafer.

Rules 110 include the design rules and are used to determine possible hotspots and layout attributes 135. Hotspots are manufacturability violations detected either with DRC-type rules (for example for via analysis, simplified Lithography checks via width/spacing rules, simplified chemical mechanical planarization (CMP) checks via density rules, etc.), or with simulator invocations possibly followed by DRC rules for manufacturability rule checking. For example, contours generated by a lithography simulation are checked for spacing violations. In one embodiment, hotspot is a marker/vertex, an edge, or a polygon. In another embodiment, it is stored together with information about yield loss cause, hierarchy information, and/or information about its environment (shape patterns, connectivity information, etc). In an embodiment, formats describing layout attributes include raw geometric violations, but also other simulation and extraction results, such as via statistics, critical area, density information, etc. In another embodiment, layout attributes include or relate to electrical information such as net IDs.

In some embodiments, the external tools 130 may be provided to provide assistance to simulations 125 to optionally determine lithography and/or etch information for fabrication.

The layout information from the layout attributes 135 and determined hot spots are used to determine a score and yield 140. Scoring represents a quantitative estimate of expected loss for a given limited yield effect. For some effects, yield models may be defined and computed. For others, a scoring function may be used that can be mapped to the MBV input language and drive the Scoring Utilities. Then scoring may then be used to define a qualitative estimate of yield loss. This information is reported and may be stored in storage 170 such as memory or hard drive to be given for the fabrication testers to assist in the determination of possible locations of hotspots.

The score and yield information 140 may also be provided as hints and constraints 150 for optimization 180 of the evaluated and future designs 105. For constraints, manufacturability violations may be prevented by either changing process parameters, or by changing the layout shapes. Some of the violations at hotspots are improved by software and—after hotspot analysis—hints for manual or automatic layout changes can be generated. In one embodiment, constraints include edge-based gradients (weight and direction to move edges). In other embodiments, the hints have a different syntax, but, in all these cases, they reflect the rules with which they were generated. For example, for the violation of a density rule, the hints may include a directive such as "increasing the density in a given bounding box by x % is associated to an increase of manufacturability by y %"; for a width/spacing violation, the hints may specify cost/gain associated to edge movements, etc.

The hotspots determined by the simulations 125 needs to be filtered because the amount of processing power that would be needed to process all the hotspots would be unreasonable. In one embodiment, too many hotspots (for a large design, millions) are generated on an "un-clean" design with a first run of MBV. To reduce these amounts to the few most important hotspots, scoring utilities that classify hotspots due to the importance, and other characteristics are used. In some embodiments, this is user-controlled via the input deck. In other embodiments, these filters generate optimization hints for the layout optimizer. In further embodiments, these filters are user-configurable.

Yield models provide predictions of geometric variation as a function of layout-pattern and process dependencies and in some cases, wafer-level tool and pattern related process dependencies. In one embodiment, Copper and Tungsten CMP 45 nm technology models to predict interconnect thickness variation in metal levels are provided and used to modify routing and fill. In another embodiment, an internal or third-party lithography model for both interconnect and transistor related etch is used. In a further embodiment, the models have or utilize a direct API into MBV.

Score and yield information 140 are also used to more accurately determine hotspots, which is also used for optimization 180.

Figure 2:
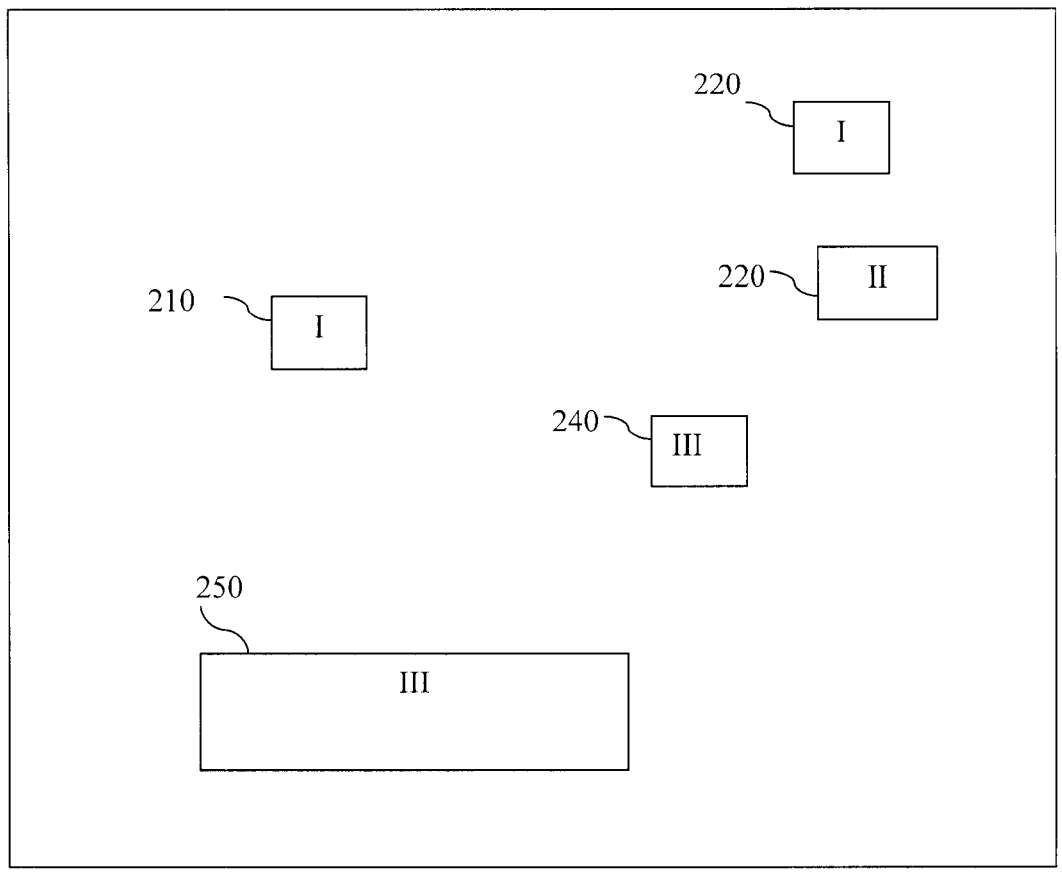
FIG. 2 illustrates an example of categorization of hotspots on a chip design according to an embodiment of the present invention.

FIG. 2 illustrates an example of categorization of hotspots on a chip design according to an embodiment of the present invention.

As provided by the filter & scoring & yield block 140, a layout design may include a list of categorized hotspots. The hotspots can be categorized and ranked. In an embodiment, a portion of the layout design 200 includes five hotspots 210, 220, 230, 240 and 250. These hotspots may be results of rule violations or other issues that causes the MBV to identify them as hotspots. In an embodiment, hotspots 210 and 220 are classified as I, which may mean they have the highest classification and that those hotspots need to be optimized. Hotspot 230 is a category II, which may mean it should be optimized. Category III hotspots 240 and 250 may mean they are not too critical so optimize them only if time is available. In another embodiment, higher categories of hotspots are correct automatically while lower categories of hotspots are provided to the layout optimizer or the fab for optional correction.

Figure 3:
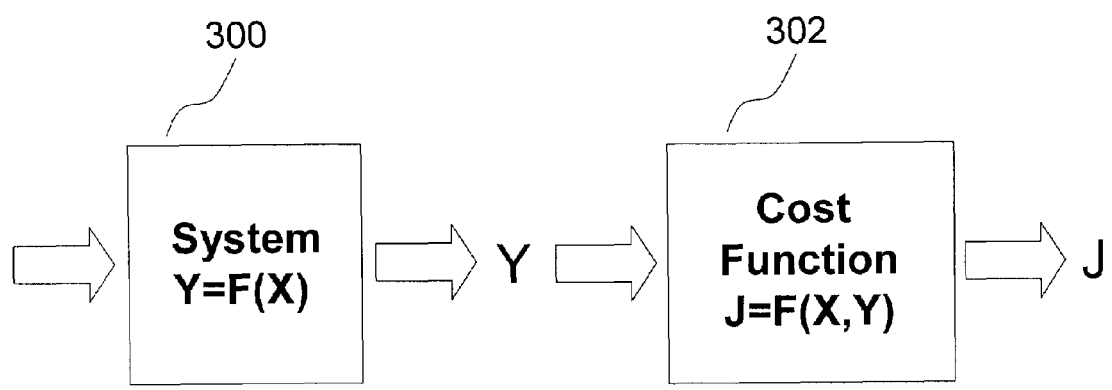
FIG. 3 depicts a block diagram of a system and cost function according to an embodiment of the present invention.

FIG. 3 depicts a block diagram of a system according to an embodiment of the present invention. A system 300 can be described as a mapping between a set of input parameters X and output parameters Y. An example of a system could be the choice of a design pattern or feature geometry X, such as wire size and spacing for a given array, and the predicted or observed post-manufactured thickness and widths of the wires (conductors) Y. The geometric description Y may provide tens to hundreds of parameters and it may be difficult to evaluate the relative goodness of one pattern instance X versus another. The cost function 302 J may use the impact Y (and possibly the state input X as well) to compute the goodness or error associated with the mapping. In the case where the cost function is associated with error, optimization involves determining the minimum of the function and when associated with goodness, optimization involves determining the maximum of the function. An example of a cost function could be computed or approximate delay associated with the interconnect geometry variation Y of a particular pattern X. An optimization component may use the cost function to evaluate each design decision or pattern and determine the 'best' based on the cost function criteria. An approach of implementing cost functions is described in co-pending U.S. patent application Ser. No. 11/142,606 entitled "Use of Models in Integrated Circuit Fabrication," filed on May 31, 2005, which is incorporated herein by reference in its entirety.

Figure 4:
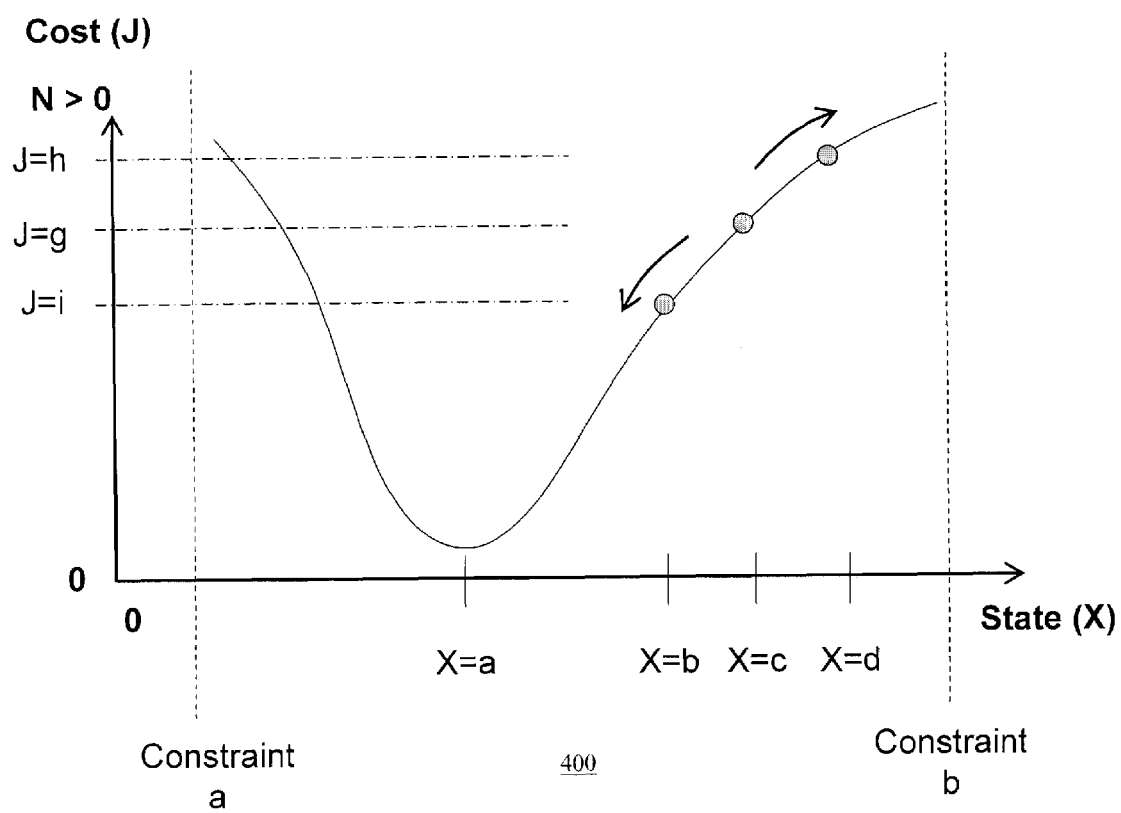
FIG. 4 illustrates an example of how optimization may be applied to parametric cost function according to an embodiment of the present invention.

FIG. 4 illustrates an example of a parametric cost function 400 and how optimization can be used to minimize the function according to an embodiment of the present invention. The cost function may measure how well an IC design achieves a desired characteristic such as an electrical metric like delay or any general functional or parametric yield metric may be used. In general the cost function is a parametric curve that is to be maximized or minimized, as shown in the embodiment of FIG. 4. It is desirable to determine the design configuration X that achieves the minimum of the curve where the cost is the least (x=a). The initial pattern to be evaluated is X=c and the associated cost is computed, J=g. The next pattern to be evaluate is X=d and the cost associated with that pattern is computed, J=h. Some optimization methods will compute the partial derivative of J with respect to x and in this case it can be observed that the increasing X from c to d, causes and increase in the cost. Optimization methods can choose to reduce X from c to b and compute the associated costs from J=g to J=i. The partial derivative indicates the cost is reduced by reducing X from c to b. The optimizer may iterate and use the change in cost to determine the direction of modifying the pattern X. This may include wire spreading and sizing to reduce thickness or width variation or the movement of edges to reduce litho induced variation. The optimization component would decrease X until the minimum is reached (i.e., X=a) and if X is reduced further the cost would begin to increase. For example, an approach of implementing cost function for dummy fill to achieve the desired thickness and electrical parameters is described in co-pending U.S. patent application Ser. No. 10/946,810 entitled "Dummy Fill for Integrated Circuits," filed on Sep. 22, 2004, which is incorporated herein by reference in its entirety.

Figure 5:
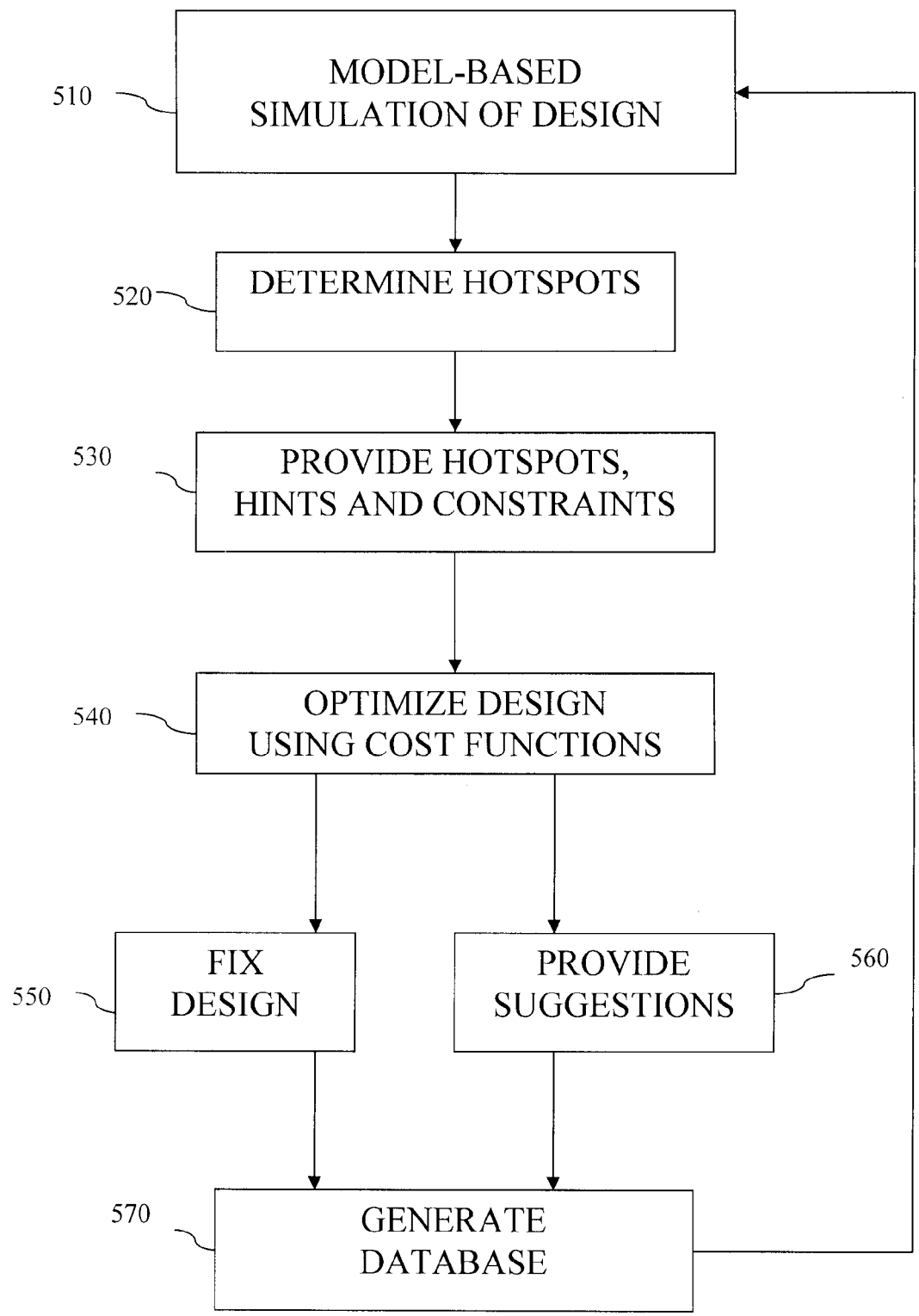
FIG. 5 depicts the flow diagram for layout optimization using model-based verification according to an embodiment of the present invention.

FIG. 5 depicts the flow diagram for layout optimization using model-based verification according to an embodiment of the present invention. This process flow 500 allows for the optimization of design to assist the manufacturers and designers using MBV tool.

At 510, a model-based simulation is performed on the design using MBV. One approach to implement MBV is described in co-pending U.S. patent application Ser. No. 11/678,592, entitled "System and Method for Performing Verification Based Upon Both Rules and Models," filed on Feb. 24, 2007, which is incorporated herein by reference in its entirety.

At 520, hotspots are determined based on the simulations and filters. In one embodiment, priorities are used for filtering. In another embodiment, the filters may use scoring and yield predictions. One approach for implementing the scoring and yield determination is described in co-pending U.S. patent application Ser. No. 11/678,593, entitled "System and Method for Model-Based Scoring and Yield Prediction," filed on Feb. 24, 2007, which is incorporated herein by reference in its entirety.

At 530, hotspots, hints and constraints are determined and provided to the layout optimizer. Hotspots may be determined as described in 520. The location, rankings, violation and/or other information associated with the hotspots may be stored and displayed if desired. The other information might include hints and constraints 150. Using the hotspots information, the layout optimizer has additional information such as a ranked list of hotspots. Therefore, the layout optimizer is improved by being provided the knowledge and suggestions for which and how the hotspots may be improved.

Hints are provided to assist in letting the layout optimizer know how and what changes can be performed on a hotspot. In one embodiment, the hints may interactively prompt the user or designer, who makes an adjustment and waits for additional hints. As such, the user or designer serves as the optimization component. This may be useful in cases where automating the optimization function in software is difficult. There are two main kinds of hints: inverse rules hints and pattern based hints. Inverse rule hints include hints that assist in the correction of rule violations. For example, spacing rule violations determined in the MBV causes a hint to spread the edges according to the physics determined by the simulations to the layout optimizer. As another example, pattern violations such as the "belt buckle" are provided to the layout optimizer with other possible patterns or instructions to fix the pattern violations. Pattern based hints include suggestions on improving pattern based violations. In some embodiments, both the physics of the surrounding design and the interactions of the other layers are analyzed in determining the hints for pattern violations. Constraints, unlike hints, are rules that are followed. For example in 45mn technology fabrication process, pitch rules has to be followed. The hotspots, hints and constraints information are provided to the layout optimizer to improve the yield by improving the optimization process.

At 540, the design may be improved using cost functions and/or information of hotspots, hints, constraints, and other rules provided by the MBV and/or layout optimizer. The cost functions, where some examples are illustrated in FIGS. 3-4, allow the designer to the cost of the design by varying the rules, parameters and physics. In one embodiment, the design is optimized when the cost function is minimized for the hotspot having the desired characteristics. In another embodiment, the optimization process includes a hierarchical list of trade-offs. For example, congestability violations (i.e. routing concerns) are minimized first, and then the RC and electrical parameters issues are addressed next (i.e. minimizing resistance and capacitance; change transistor shapes to reduce litho effects). The list may include other optimization information such as improving manufacturability, improve power consumption, reduce layout size, etc.

At 550, the hotspots are optimized automatically. For example, the hotspots are optimized automatically using the information from 530 if they have the required priority.

In the alternative at 560, the hotspot is flagged and suggestions on possible ways to improve the design at the hotspot are provided to the user. For example, the hotspot is categorized relatively low so optimization is not mandatory. This option allows the user to have more control over the optimization of the design.

At 570, the models and hotspots may be used to generate a database. In some embodiments, the database includes information to make sure low yield configurations are not used in the layout design. In other embodiments, the database may store important data that can be mined later and used to create new rules or design recommendations.

Figure 6:
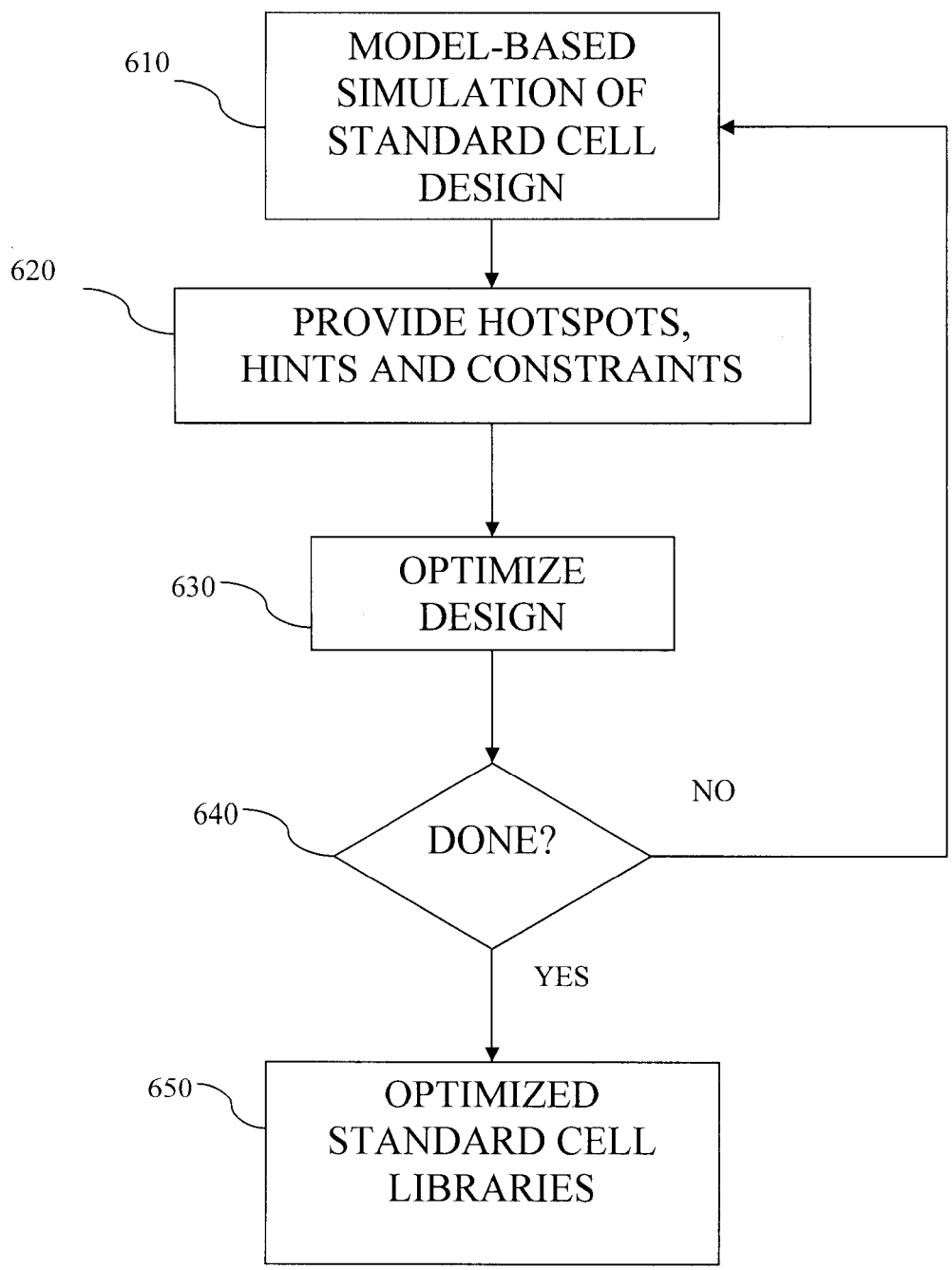
FIG. 6 depicts the flow diagram for optimizing stand cell libraries according to an embodiment of the present invention.

FIG. 6 depicts the flow diagram for optimizing standard cell libraries according to an embodiment of the present invention. For standard cell libraries, only a few cells are designed and analyzed, but they are finely tuned and optimized. This is required because these cells may be repeatedly used in other circuit designs.

At 610, a model-based simulation is performed on the standard cell using MBV. One approach to implement MBV for model-based simulation is described in co-pending U.S. patent application Ser. No. 11/678,592, entitled "System and Method for Performing Verification Based Upon Both Rules and Models," filed on Feb. 24, 2007, which is incorporated herein by reference in its entirety.

At 620, hotspots, hints and constraints are determined and provided to the layout optimizer similar to 530. The hotspots are determined based on the simulations and filtered. One approach for implementing the scoring and yield determination is described in co-pending U.S. patent application Ser. No. 11/678,593, entitled "System and Method for Model-Based Scoring and Yield Prediction," filed on Feb. 24, 2007, which is incorporated herein by reference in its entirety.

At 630, the cell is optimized using the hints, constraints, and other hotspots information provided by 620. The hints, constraints and hotspot information may be similar to the ones described in 530.

At 640, a determination is made whether the cell design is optimized. If it is then it is stored in the cell library as an optimized standard cell library design. If it is not, 610-630 are repeated for the semi-optimized design after a previous iteration. This process is repeated multiple times because it is crucial that the cell layout is optimal.

At 650, the cell layout design is optimized and is compiled and stored in databases or any other storage to form libraries. The standard cell libraries having optimal cell designs are now available for use by other layout designs as desired by the designers.

Figure 7:
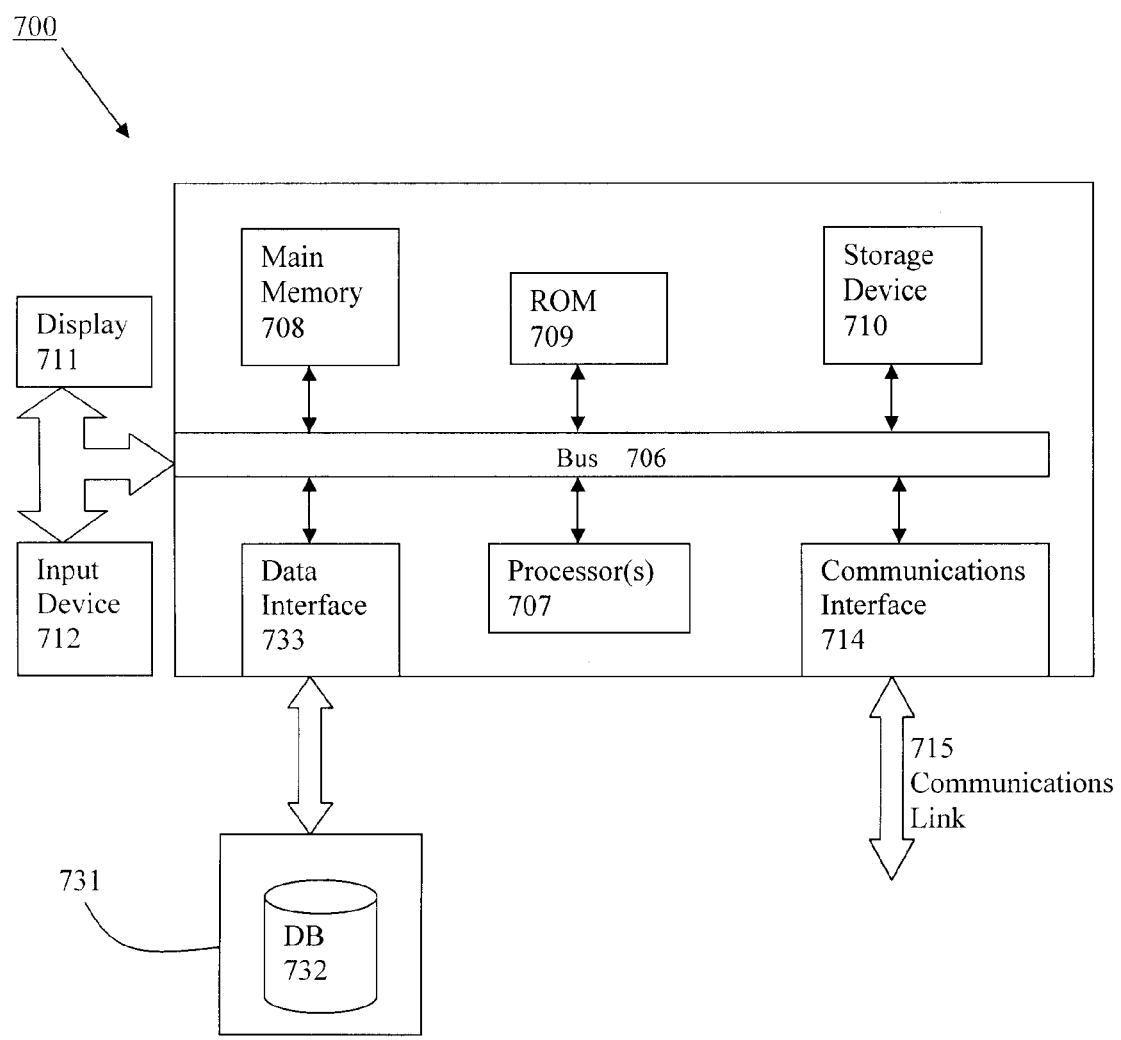
FIG. 7 depicts a computerized system on which a method for verification based on rules and models can be implemented.

FIG. 7 depicts a computerized system on which a method for verification based on rules and models can be implemented. The execution of the sequences of instructions required to practice the embodiments may be performed by a computer system 700 as shown in FIG. 7. In an embodiment, execution of the sequences of instructions is performed by a single computer system 700. According to other embodiments, two or more computer systems 700 coupled by a communication link 715 may perform the sequence of instructions in coordination with one another. Although a description of only one computer system 700 will be presented below, however, it should be understood that any number of computer systems 700 may be employed to practice the embodiments.

A computer system 700 according to an embodiment will now be described with reference to FIG. 7, which is a block diagram of the functional components of a computer system 700. As used herein, the term computer system 700 is broadly used to describe any computing device that can store and independently run one or more programs.

Each computer system 700 may include a communication interface 714 coupled to the bus 706. The communication interface 714 provides two-way communication between computer systems 700. The communication interface 714 of a respective computer system 700 transmits and receives electrical, electromagnetic or optical signals, which include data streams representing various types of signal information, e.g., instructions, messages and data. A communication link 715 links one computer system 700 with another computer system 700. For example, the communication link 715 may be a LAN, in which case the communication interface 714 may be a LAN card, or the communication link 715 may be a PSTN, in which case the communication interface 714 may be an integrated services digital network (ISDN) card or a modem, or the communication link 715 may be the Internet, in which case the communication interface 714 may be a dial-up, cable or wireless modem.

A computer system 700 may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution.

In an embodiment, the computer system 700 operates in conjunction with a data storage system 731, e.g., a data storage system 731 that contain a database 732 that is readily accessible by the computer system 700. The computer system 700 communicates with the data storage system 731 through a data interface 733. A data interface 733, which is coupled to the bus 706, transmits and receives electrical, electromagnetic or optical signals, which include data streams representing various types of signal information, e.g., instructions, messages and data. In embodiments, the functions of the data interface 733 may be performed by the communication interface 714.

Computer system 700 includes a bus 706 or other communication mechanism for communicating instructions, messages and data, collectively, information, and one or more processors 707 coupled with the bus 706 for processing information. Computer system 700 also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

The computer system 700 may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A computer system 700 may be coupled via the bus 706 to a display device 711, such as, but not limited to, a cathode ray tube (CRT), for displaying information to a user. An input device 712, e.g., alphanumeric and other keys, is coupled to the bus 706 for communicating information and command selections to the processor(s) 707.

According to one embodiment, an individual computer system 700 performs specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709, CD ROM, magnetic tape, and magnetic discs. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A method for layout optimization comprising:
predicting a physical realization of a layout design based at least in part upon model parameters;
analyzing by a processor the predicted physical realization to determine hotspot optimization information, wherein the hotspot optimization information is associated at least in part with score and yield information of one or more hotspots;
providing the hotspot optimization information to a layout optimizer;
optimizing the layout design based at least in part upon the provided hotpot optimization information; and
storing the layout design in a volatile or non-volatile computer-usable medium or displaying the layout design on a display device.

2. The method of claim 1, further comprising providing hints and/or constraints.

3. The method of claim 1, further comprising automatically optimizing the layout design.

4. A method of claim 1, further comprising: generating a database having models and hotspots information.

5. The method of claim 1, wherein the optimizing is based on pure model enabled geometry, computational electrical characteristics or post RC analysis.

6. The method of claim 1, wherein the optimizing is based on utilizing cost functions.

7. The method of claim 6, wherein the cost functions are based on rules, models, or a combination thereof.

8. The method of claim 1, wherein the layout design is part of standard cell libraries.

9. A system for layout optimization comprising:
    means for predicting a physical realization of a layout design based at least in part upon model parameters;
    a processor for analyzing the predicted physical realization to determine hotspot optimization information, wherein the hotspot optimization information is associated at least in part with score and yield information of one or more hotspots;
    means for providing the hotspot optimization information to a layout optimizer;
    means for optimizing the layout design based at least in part upon the provided hotpot optimization information; and
    a volatile or non-volatile computer-usable medium for storing the layout design or a display device for displaying the layout design.

10. The system of claim 9, further comprising means for providing hints and/or constraints.

11. The system of claim 9, further comprising means for automatically optimizing the layout design.

12. The system of claim 9, wherein the means for optimizing is based on pure model enabled geometry, computational electrical characteristics or post RC analysis.

13. The system of claim 9, wherein the means for optimizing is based on utilizing cost functions.

14. The system of claim 9, wherein the layout design is part of standard cell libraries.

15. A computer program product embodied in a volatile or non-volatile computer-usable medium having executable code to execute a process by a processor for layout optimization, the process comprising:
    predicting a physical realization of a layout design based at least in part upon model parameters;
    analyzing the predicted physical realization to determine hotspot optimization information, wherein the hotspot optimization information is associated at least in part with score and yield information of one or more hotspots;
    providing the hotspot optimization information to a layout optimizer;
    optimizing the layout design based at least in part upon the provided hotpot optimization information; and
    storing the layout design or displaying the layout design on a display device.

16. The product of claim 15, further comprising providing hints and/or constraints.

17. The product of claim 15, further comprising automatically optimizing the layout design.

18. The product of claim 15, wherein the optimizing is based on pure model enabled geometry, computational electrical characteristics or post RC analysis.

19. The product of claim 15, wherein the optimizing is based on utilizing cost functions.

20. The product of claim 15, wherein the layout design is part of standard cell libraries.

* * * * *